United States Patent
Sequeira et al.

(10) Patent No.: US 9,489,478 B2
(45) Date of Patent: Nov. 8, 2016

(54) SIMPLIFYING MODES OF AN ELECTRONIC CIRCUIT BY REDUCING CONSTRAINTS

(71) Applicant: Synopsys, Inc., Mountain View, CA (US)

(72) Inventors: Ajit Sequeira, Bangalore (IN); Subramanyam Sripada, Hillsboro, OR (US); Subrahmanya Narasimha Murthy Palla, Hyderabad (IN)

(73) Assignee: Synopsys, Inc., Mountain View, CA (US)

( * ) Notice: Subject to any disclaimer, the term of this patent is extended or adjusted under 35 U.S.C. 154(b) by 39 days.

(21) Appl. No.: 14/568,613

(22) Filed: Dec. 12, 2014

(65) Prior Publication Data
US 2016/0110485 A1   Apr. 21, 2016

(30) Foreign Application Priority Data
Oct. 17, 2014 (IN) .......................... 5195/CHE/2014

(51) Int. Cl.
*G06F 17/50* (2006.01)

(52) U.S. Cl.
CPC ....... *G06F 17/5031* (2013.01); *G06F 17/5045* (2013.01)

(58) Field of Classification Search
CPC ................................................. G06F 17/5031
USPC ........................................ 716/108, 113, 134
See application file for complete search history.

(56) References Cited

U.S. PATENT DOCUMENTS

| 5,475,607 A * | 12/1995 | Apte ................... G06F 17/5072 716/113 |
| 5,528,511 A | 6/1996 | Hasegawa |
| 6,308,306 B1 | 10/2001 | Kaneko |
| 6,438,731 B1 * | 8/2002 | Segal .................. G06F 17/5031 716/122 |
| 6,487,705 B1 | 11/2002 | Roethig et al. |
| 7,284,219 B1 | 10/2007 | Manaker, Jr. et al. |
| 7,418,684 B1 | 8/2008 | Moon et al. |
| 7,698,674 B2 | 4/2010 | Kalafala et al. |
| 8,196,076 B2 | 6/2012 | Chander et al. |
| 8,209,648 B1 | 6/2012 | Ku et al. |
| 8,261,221 B2 | 9/2012 | Singhal et al. |
| 8,438,517 B2 * | 5/2013 | Appleton ............ G06F 17/5031 716/108 |
| 8,572,532 B1 * | 10/2013 | Singh .................... G06F 17/505 716/107 |

(Continued)

OTHER PUBLICATIONS

Das, S. et al. "The Automatic Generation of Merged-Mode Design Constraints", DAC 2009 Jul. 29, 2009, User Track (http://www.dac.com/46th/proceedings/slides/04U_5.ppt).

(Continued)

*Primary Examiner* — Sun Lin
(74) *Attorney, Agent, or Firm* — Fenwick & West LLP

(57) ABSTRACT

A mode of a circuit design is simplified by eliminating clocks and corresponding timing exceptions and timing constraints from the mode. A system receives a description of a mode of a circuit. The system identifies sets of clock pairs and corresponding timing exceptions associated with timing nodes of the mode, each clock pair comprising a launch clock and a capture clock. The system compares time intervals between an edge of the launch clock and a corresponding edge of the capture clock for the clock pairs subject to timing exceptions associated with the timing path. The system identifies certain clock pairs as critical based on a comparison of the time interval associated with each clock pair. The system simplifies the mode by eliminating non-critical clocks and corresponding timing exceptions. The modified mode is used for performing timing analysis.

20 Claims, 6 Drawing Sheets

(56) References Cited

U.S. PATENT DOCUMENTS

| | | | |
|---|---|---|---|
| 8,607,186 B2* | 12/2013 | Sripada | G06F 17/5022 703/13 |
| 8,627,262 B2 | 1/2014 | Sripada et al. | |
| 8,701,074 B2* | 4/2014 | Sripada | G06F 17/5031 716/106 |
| 2003/0229871 A1 | 12/2003 | Nakae et al. | |
| 2004/0210861 A1 | 10/2004 | Kucukcakar et al. | |
| 2007/0234253 A1 | 10/2007 | Soreff et al. | |
| 2008/0301598 A1 | 12/2008 | Gangadharan et al. | |
| 2009/0132984 A1 | 5/2009 | Chander et al. | |
| 2009/0326873 A1 | 12/2009 | Wang et al. | |

OTHER PUBLICATIONS

Gangadharan, S. et al., "Preserving the Intent of Timing Constraints", EDA Design Line, May 17, 2008, [Online] [Retrieved on Nov. 5, 2010] Retrieved from the Internet<URL:http://www.edadesignline.com/207800772?printable-Article=true>.

PCT International Search Report and Written Opinion, PCT Application No. PCT/US2011/032268, Oct. 25, 2011, 9 pages.

United States Office Action, U.S. Appl. No. 12/759,625, Jan. 20, 2012, 15 pages.

United States Office Action, U.S. Appl. No. 13/025,075, May 16, 2012, 10 pages.

United States Office Action, U.S. Appl. No. 13/025,075, Oct. 17, 2012, 12 pages.

United States Office Action, U.S. Appl. No. 13/328,572, Dec. 24, 2012, 13 pages.

United States Office Action, U.S. Appl. No. 13/328,572, Jun. 14, 2013, 18 pages.

"Advanced Static Timing Analysis Using SmartTime," Application No. AC379, Microsemi Corporation, Nov. 2011, pp. 1-43.

\* cited by examiner

SIMPLIFYING MODES OF AN ELECTRONIC CIRCUIT BY REDUCING CONSTRAINTS

CROSS REFERENCE TO RELATED APPLICATIONS

This application claims the benefit of Indian Provisional Patent application serial no. 5195/CHE/2014, filed Oct. 17, 2014, which is incorporated by reference in its entirety.

BACKGROUND

This invention relates generally to electronic design automation (EDA) of circuits and in particular to simplifying modes of an electronic circuit by reducing constraints of the modes.

Static timing analysis (STA) validates timing performance of a circuit design by checking various paths of an electronic circuit for timing violations. Performing static timing analysis for large electronic circuits can take significant time. Static timing analysis may be repeated multiple times during different stages of the circuit design. Furthermore, timing analysis is repeated multiple times for the same electronic design for various combinations of modes and corners.

Semiconductor device parameters can vary with conditions such as fabrication process, operating temperature, and power supply voltage. A circuit fabricated using these processes may run slower or faster than specified due to variations in operating conditions or may even fail to function. Therefore timing analysis is performed for various operating conditions to make sure that the circuit performs as specified under these conditions. Such operating conditions for a circuit are modeled using corners that comprise a set of libraries characterized for process, voltage, and temperature variations.

The timing analysis of a circuit is also repeated for different operating modes, for example, normal operating mode, test mode, scan mode, reset mode and so on. For example, a circuit used in a computer operates in a stand-by mode when the computer is in stand-by mode. Similarly, during testing phase, a circuit may be operated in a test mode. If each mode is verified for each corner condition, the total number of scenarios in which the design is verified is the product of the number of modes and number of corners. This results in the timing analysis being performed several times resulting in exorbitant costs.

One way to handle the large number of scenarios resulting from multiple modes and corners is to merge the modes into a smaller set, for example, a single mode. Since timing verification must be performed for the combination of modes and corners, reduction in the number of modes reduces the total combinations of modes and corners by a much larger number. For example, if there are 10 modes and 10 corners, the total number of combination of modes and corners is 10×10=100. However if the 10 modes are merged into one merged mode, the total number of combinations is reduced to 1×10=10. This is a 90% reduction in the number of combinations that need to be verified.

However, when multiple individual modes are merged into a single merged mode, the merged mode can be complex compared to each of the individual modes. For example, the number of clocks and exceptions in a merged mode is typically more than the number of clocks of found in any individual mode. Also, the number of timing constraints in the merged mode is typically more than the number of timing constraints of each individual mode. As a result, the analysis of the merged mode is slower than the analysis of individual modes and may require more resources with higher capacity for analysis. As a result, conventional techniques for merging modes result in high overall turn-around time for the electronic design process.

SUMMARY

The above and other issues are addressed by a computer-implemented method, computer system, and computer program product for simplifying a mode of a circuit design by reducing the constraints of the mode. A description of a mode of a circuit is received. The description of the mode comprises a netlist and timing constraints associated with the netlist. A set of timing nodes of the circuit is identified for analyzing clock pairs associated with the timing nodes. The system selects critical clock pairs associated with timing nodes from the identified set of timing nodes. To select the critical clock pairs, the system performs the following steps. For each timing node in the identified set of timing nodes, the system determines a set of clock pairs. Each clock pair includes a launch clock and a capture clock associated with a timing path associated with the timing node. The system determines a time interval between an edge of the launch clock and the matching edge of the capture clock for each clock pair of the set. In an embodiment, the time interval takes into account timing exceptions and any other constraints associated with the clock pair, for example, multi-cycle path or false path timing exceptions. The system compares the time intervals associated with various clock pairs to identify the clock with the smallest time interval. The system marks the clock pair with the smallest time interval as a critical clock pair and also timing exceptions associated with the critical clock pair. Accordingly, the system identifies a set of critical clock pairs associated with the set of timing nodes. The system modifies the description of the mode by eliminating clocks that do not occur in any critical clock pair. The system may also eliminate timing exceptions and constraints related to the clocks being eliminated. The system uses the modified mode for performing timing analysis of the circuit.

In an embodiment, the above process for simplifying modes is used for a merged mode because the process of merging individual modes into a merged mode introduces a large number of clocks in the merged mode. The process of merging the modes identifies sets of timing relationships associated with timing nodes for the merged mode and the individual modes for comparison. A set of timing relationships associated with a timing node is used to determine a set of clock pairs associated with the timing node in the merged mode. The system uses the set of clock pairs to identify critical clock pairs for use in simplifying the merged mode.

In an embodiment, the process of merging individual modes performs multiple passes. The first pass determines timing relationships associated with end points of the circuit. The timing relationships identified in the first pass are used to identify critical clock pairs associated with the end points. The second pass determines timing relationships associated with start points of the circuit associated with an end point. The timing relationships identified in the second pass are used to identify critical clock pairs and corresponding exceptions for the start points associated with an end point. A third pass determines timing relationships associated with reconvergent points of the circuit between one start point and one end point. The timing relationships identified in the third pass are used to identify critical clock pairs and corresponding exceptions associated with the reconvergent points. The critical clock pairs determined in the different passes form a set of critical clock pairs for the merged mode. The set of critical clock pairs is used to simplify the merged mode by eliminating clock pairs that do not occur in any critical clock pairs. In some embodiments, fewer than three passes may be executed.

The features and advantages described in this summary and the following detailed description are not all-inclusive. Many additional features and advantages will be apparent to one of ordinary skill in the art in view of the drawings, specification, and claims hereof.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

Figure 1:
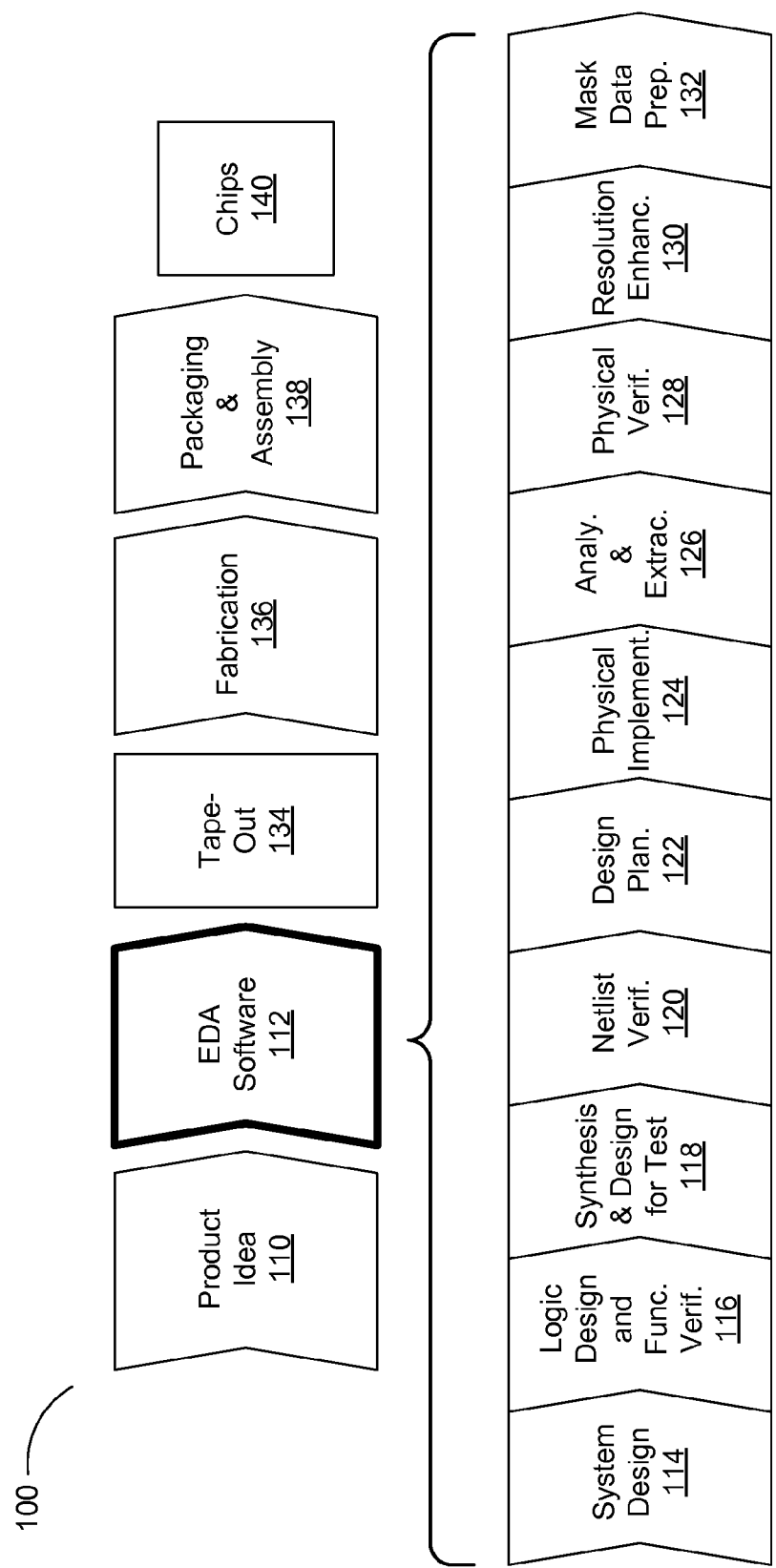
FIG. 1 is a flowchart illustrating the various operations in the design and fabrication of an integrated circuit.

FIG. 1 is a flowchart illustrating the various operations in the design and fabrication of an integrated circuit. This process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 6:
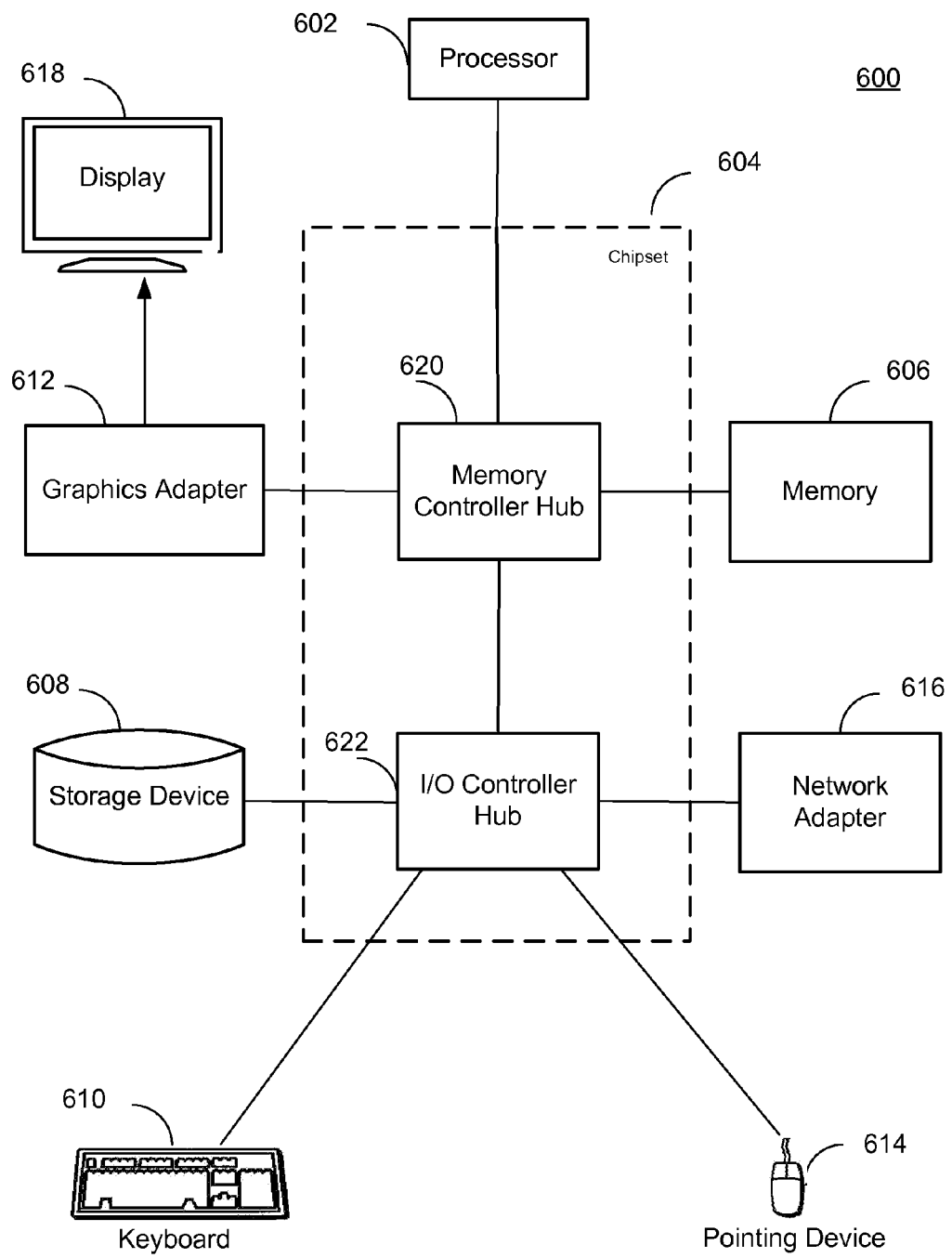
FIG. 6 is a high-level block diagram illustrating an example of a computer for use in simplification of modes of circuits, in accordance with an embodiment.

The EDA software 112 may be implemented in one or more computing devices such as the computer 600 of FIG. 6. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 112 that includes operations between design planning 122 and physical implementation 124. One type of analysis performed by the EDA software 112 corresponds to timing analysis of an electronic circuit, for example, static timing analysis that analyses timing of an electronic circuit without performing a detailed simulation of the circuit.

As an example, the process of simplifying modes is applied to modes obtained by merging a plurality of individual modes. A plurality of modes may be merged into a single merged mode, either automatically or manually to reduce the number of modes that need to be processed for performing timing analysis. The merged mode is processed instead of processing the plurality of individual modes resulting in significant savings in the time required for performing the timing analysis. The merged mode however includes a large number of clocks, for example, more clocks than any of the individual modes. The process of simplifying the modes is used to reduce the number of clocks of the merged mode and also timing constraints related to the clocks. However, embodiments are not limited to simplifying merged modes but can be used to simplify individual modes or complex modes generated in any other context.

The process of merging modes compares timing relationships associated with various timing nodes of the merged mode and the individual modes. A timing relationship is specified between a pair of timing nodes and comprises a launching clock, a capturing clock, and timing state, for example, multicycle path or false path between the start point and end point, a timing node specified as having a constant value etc.

Figure 2:
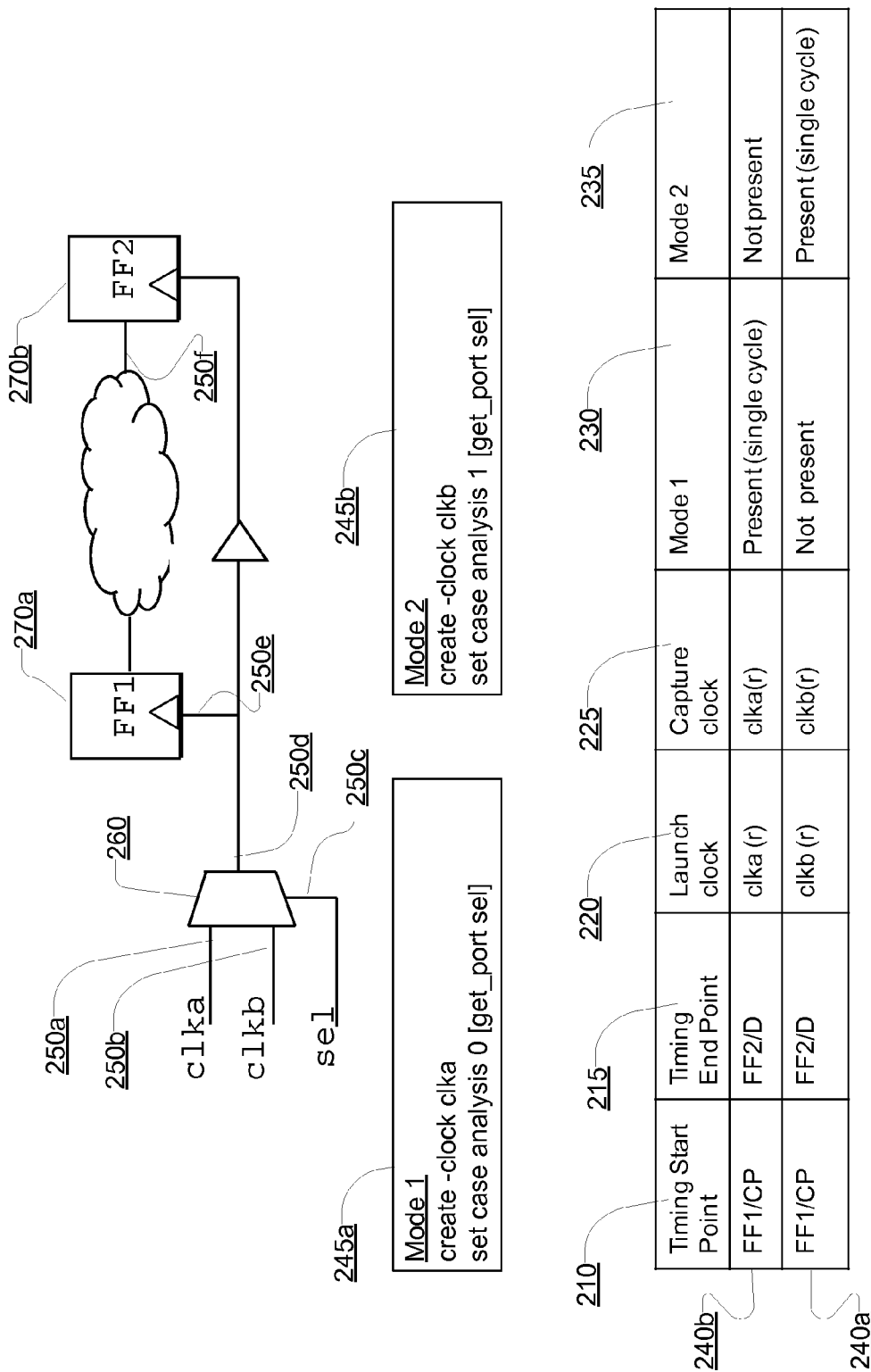
FIG. 2 illustrates timing relationships for a circuit associated with multiple modes, according to an embodiment.

FIG. 2 illustrates timing relationships for a circuit associated with multiple modes. The circuit comprises various circuit elements including flip-flops 270a, 270b, a multiplexer 260, two clock inputs clka 250a and clkb 250b, a multiplexer select input signal 250c. There are two modes associated with the circuit, 245a and 245b. The mode 1 comprises a command for creating a clock clka 250a and a command for specifying the value of port 250c to be the constant 0. The mode 2 comprises a command for creating a clock clkb 250b and a command for specifying the value of port 250c to be the constant 1. The table 205 shows a structure for storing timing relations associated with the circuit. The timing relationships 240a and 240b comprise a timing start point 210, a timing end point 215, a launch clock 220, a capture clock 225, and information 230, 235 indicating whether the timing constraint is present in mode 1 and/or mode 2 respectively.

The information stored in a timing relationship is not limited to the information illustrated in table 205 and may comprise other relevant information. Both timing relations 240a, 240b correspond to timing start point 250e (FF1/CP) and timing end point 250f (FF2/D). However the launch clock and the capture clock for timing 240a are both clkb(r), indicating the rising edge of clkb is used for both launch clock and capture clock for timing 240a. On the other hand, the launch clock and the capture clock for timing 240b are both clka(r), indicating the rising edge of clka is used for both launch clock and capture clock for timing 240b. Furthermore, the timing relationship 240b is present in mode 1 as a single cycle path as shown in column 230 but not present in mode 2 as shown in column 235. Similarly, the timing relationship 240a is not present in mode 1 as shown in column 230 but present in mode 2 as a single cycle path as shown in column 235.

System Architecture

Figure 3:
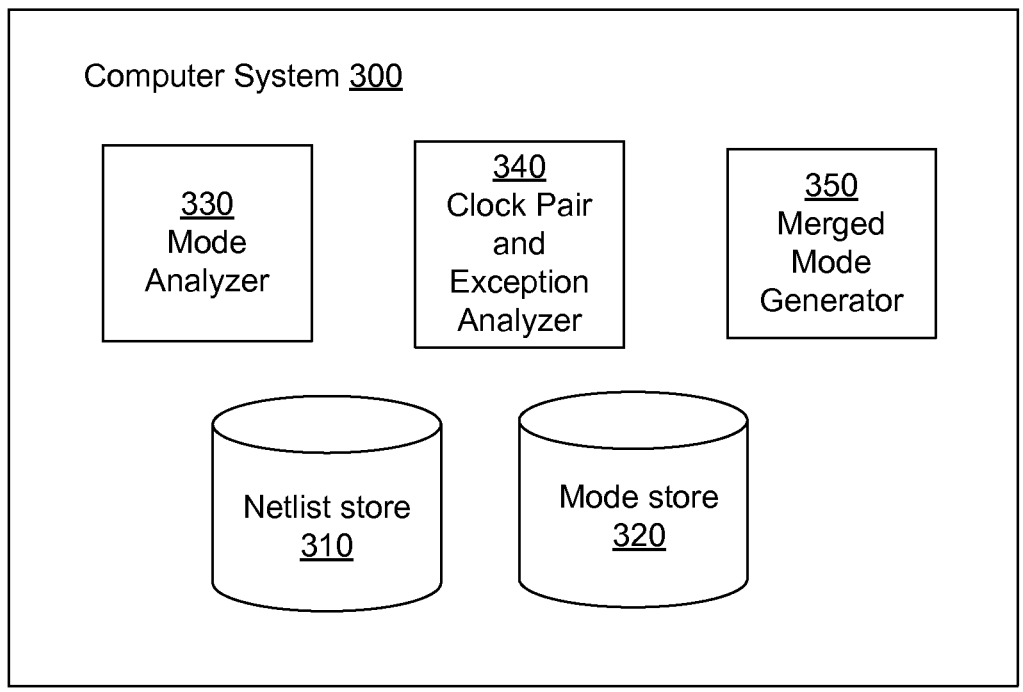
FIG. 3 illustrates the system architecture for simplifying a mode of a circuit design by eliminating timing constraints, according to an embodiment.

FIG. 3 illustrates the system architecture for simplifying a mode of a circuit design by eliminating timing constraints, according to an embodiment. The computer architecture illustrated in FIG. 3 comprises a computer system 300 comprising a mode analyzer 330, a clock pair and exception analyzer 340, a merged mode generator 350, a netlist store 310 and a mode store 320. In some embodiments, the computer system 300 may include more or less modules than those described herein. Furthermore, functionality described as being performed by a particular module may be performed by modules other than those indicated herein. Furthermore, certain steps may be performed by multiple processors. For example, analysis of two independent modes may be performed in parallel.

The netlist store 310 stores the netlists of the circuit being analyzed. The netlist comprises various components and interconnections between the components. In an embodiment, the netlist is stored using a graph representation. For example, components may be represented as nodes and interconnections between the components may be represented as edges. A component may be associated with various parameters, for example, amount of signal delay caused by the component to a signal passing through the component.

A circuit includes certain timing nodes identified as start points and end points. A start point of a circuit design can be a clock pin or an input port. For example, a start point can be a clock pin or data pin of a latch or a clock pin of a register. An end point can be a data pin of a register or latch or an output port of a circuit design. A timing node can be a reconvergent node at which multiple timing paths meet. For example, a component may correspond to a reconvergent node if two different signals arriving from two different paths are provided as input for the component. In a graph representation of the circuit, a start point of the circuit is the timing node that has no incoming edges to the timing node within the circuit being considered. In the graph representation of the circuit, the end point is a timing node that has no outgoing edges.

The mode store 320 stores the information describing various modes. A mode is characterized by various timing constraints. For example, a mode may be modeled using a unique set of clocks, input voltages, and timing constraints in similar operating conditions. Timing constraints include specifications of clock signals, delay requirements at inputs and outputs in the circuit, and various exceptions, for example, specifications of false paths, multi-cycle paths, minimum or maximum delays and the like. Timing constraints can be automatically generated by tools or manually added/modified. Timing constraints for circuits can be specified using a text file representation, for example, a SYNOPSYS DESIGN CONSTRAINTS (SDC) file. In an embodiment, where the system 300 merges individual modes into merged modes, the mode store 320 stores the individual modes as well as the merged mode being processed.

The mode analyzer 330 analyzes modes of circuits and simplifies the mode by eliminating timing constraints from the mode, for example, clocks and corresponding timing exceptions. The mode analyzer 330 identifies timing constraints that can be eliminated without affecting the overall timing analysis of the mode, for all practical purposes. In other words, the mode analyzer 330 simplifies a mode such that the chances of obtaining incorrect timing results by analyzing the simplified mode are extremely small. The mode analyzer 330 may simplify the mode so that the resulting analysis is useful for several stages of the electronic design. In an embodiment, the computer system 300 uses the simplified modes generated by the mode analyzer 330 for various stages of electronic design except the final signoff.//make it general//

The mode analyzer 330 identifies various clock pairs associated with a mode and provides these clock pairs to the clock pair and exception analyzer 340. A clock pair comprises a launch clock and a capture clock associated with a timing path of the circuit. The clock pair and exception analyzer 340 receives sets of clock pairs from the mode analyzer 330 and identifies clock pairs that are significant for purposes of analysis of the mode. The clock pair and exception analyzer 340 identifies these clock pairs as critical clock pairs and provides these clock pairs to the mode analyzer 330. The mode analyzer 330 uses the information provided by the clock pair and exception analyzer 340 to determine which clocks and timing constraints can be eliminated from the mode for generating a simplified mode.

The merged mode generator 350 merges a set of individual modes into a merged mode. Individual modes may be merged into a merged mode either manually or automatically. Systems and methods for merging modes are described in U.S. patent application Ser. No. 12/960,745, filed on Dec. 6, 2010, now issued as U.S. Pat. No. 8,627,262 which is incorporated by reference herein. The process of merging the modes results in a merged mode that can have more clocks and timing exceptions than any of the individual modes that are merged. Accordingly, the merged mode generator 350 invokes the mode analyzer 330 to generate a simplified mode for a given merged mode.

Simplifying Modes of a Circuit Design

Figure 4:
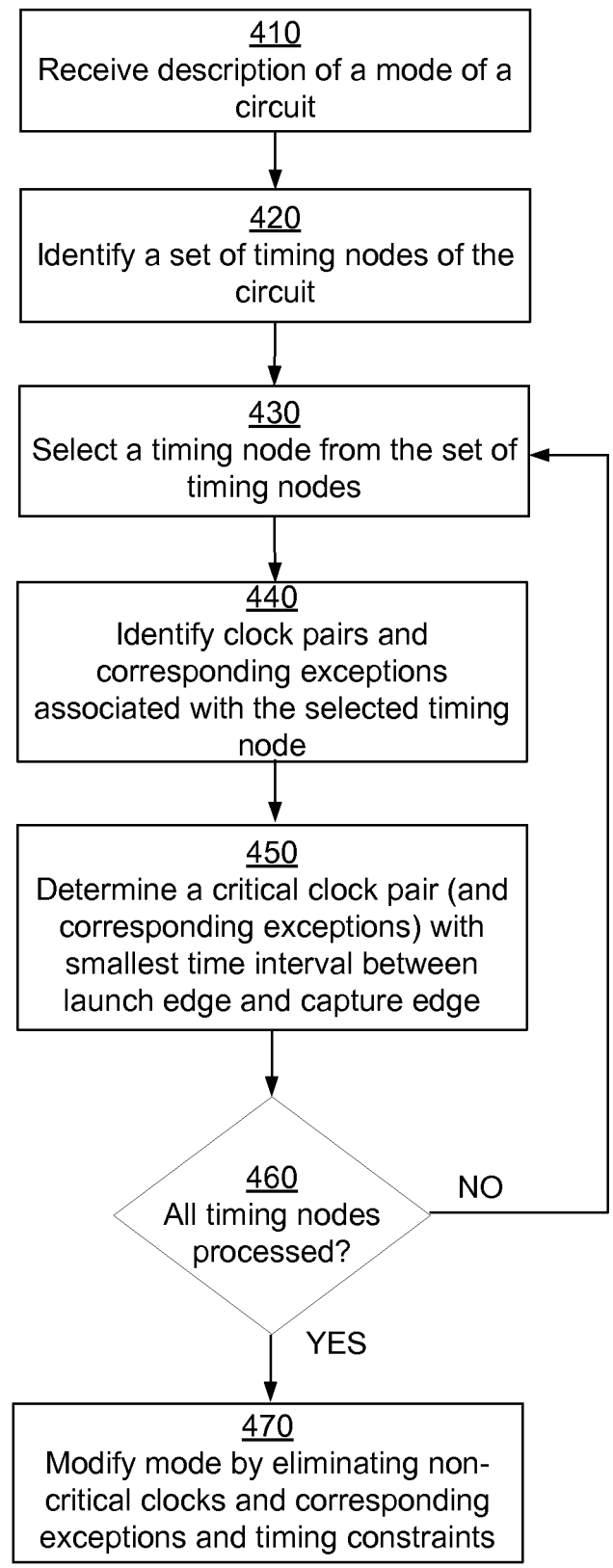
FIG. 4 illustrates the process of simplifying a mode of a circuit design by eliminating non-critical clock pairs and corresponding timing exceptions and associated timing constraints, according to an embodiment.

FIG. 4 illustrates the process of simplifying a mode of a circuit design by eliminating non-critical clock pairs and corresponding exceptions and associated timing constraints, according to an embodiment. In some embodiments, certain steps may be performed in different order than that indicated in FIG. 4. For example, certain steps may be performed in parallel. The steps may be performed by modules different from those indicated herein.

The mode analyzer 330 receives 410 a description of a mode of a circuit. In an embodiment, the description of the mode of the circuit is stored in the mode store 320 and the netlist store 310. In an embodiment, the mode of the circuit is a merged mode generated by merging multiple individual modes. In this embodiment, the merged mode generator 350 and the mode analyzer 330 interact with each other to simplify the merged mode being generated. Further description of this embodiment is given in the process illustrated in FIG. 5.

The mode analyzer 330 identifies 420 a set of timing nodes of the received mode for analysis. The set of timing nodes may be received from the merge mode generator 350, for example during various passes associated with the process of merging modes. The set of timing nodes may include a single node or multiple nodes. For example, the mode analyzer 330 may select a set of nodes for analysis for example, start points, end points, or reconvergent points.

The mode analyzer 330 selects 430 a timing node from the set of timing nodes for analysis. The mode analyzer 330 identifies 440 clock pairs (each clock pair including a launch clock and a capture clock) and corresponding exceptions that occur on timing paths associated with the selected timing nodes. Examples of exceptions corresponding to a clock pair (or individual clocks) include exceptions that define false path, multi cycle path, maximum and minimum delays, and so on. Examples of timing constraints (that are not exceptions) associated with a clock pair (or individual clocks) include timing constraints that set clock parameters, for example, clock latency, create clock, and so on. A timing path may be associated with a timing node if the timing path originates at the timing node, terminates at the timing node, or if the timing node lies on the timing path.

In an embodiment, if the selected timing node is an end point, the mode analyzer 330 starts from a set of start points and traverses the graph representing the netlist of the circuit design to reach the end point. The mode analyzer 330 identifies launch and capture clocks and corresponding exceptions encountered while performing the above graph traversal. Alternatively, if the selected timing node is a start point, the mode analyzer 330 starts from one or more end points and traverses the graph from the end points to reach the start point. The mode analyzer 330 identifies launch and capture clocks encountered while performing this graph traversal. As a result, the mode analyzer 330 determines a set of launch/capture clocks and corresponding exceptions associated with timing paths reaching the selected timing node (or timing paths originating from the selected timing node). The graph traversals for identifying the clock pairs and corresponding exceptions may be performed by the merged mode generator 350 as part of the process of generating a merged mode from individual modes.

The mode analyzer 330 provides the set of launch/capture clocks and corresponding exceptions to the clock pair and exception analyzer 340. The clock pair and exception analyzer 340 determines 450 a critical clock pair from the set of clock pairs received. The clock pair and exception analyzer 340 determines 450 the critical clock pair by comparing the clock pairs from the set of launch/capture clocks. The clock pair and exception analyzer 340 determines a time interval associated with the launch clock and the capture clock for each clock pair. The time interval is the time interval between an edge of the launch clock and the corresponding edge of the capture clock.

In an embodiment, the clock pair and exception analyzer 340 determines the time interval between the edge of the launch clock and the matching edge of the capture clock for each pair of clocks subject to timing exceptions associated with the timing path of the pair of clocks. For example, a timing path associated with the timing node may have a multi-cycle path exception. The clock pair and exception analyzer 340 determines the time interval for the launch/capture clock taking into consideration, the number of cycles of the multi-cycle timing exception. For example, assume the multi-cycle exception specifies that the timing path takes two cycles. Accordingly, the clock pair and exception analyzer 340 determines the time interval between the rising (or falling) edges of the launch clock and the capture clock that are at least two cycles apart.

The clock pair and exception analyzer 340 compares the time intervals of the various clock pairs to identify the clock pair with the smallest time interval. The clock pair and exception analyzer 340 marks the identified clock pair with the smallest time interval as a critical clock pair and corresponding timing exceptions. The clock pair and exception analyzer 340 also identifies and exceptions corresponding to the clocks of the critical clock pair. This clock pair is identified as critical because the associated timing path is the most likely to fail if additional delay was introduced in the timing path (as compared to the remaining timing paths associated with the timing node). The remaining timing paths are less likely to fail because larger delays (compared to the timing path of the critical clock pair) have to be introduced along those timing paths to cause timing failures.

In an embodiment, the clock pair and exception analyzer 340 also checks if the timing constraints associated with the timing path of the pair of clocks are timing constraints that are not overridden by other timing. In other words, if a timing path is associated with two or more timing constraints and there is a timing constraint that is dominant over the remaining constraints and overrides the remaining timing constraints, the clock pair analyzer 340 determines the time interval based on the dominant constraint rather than the remaining constraints.

For example, if the timing path is associated with a multi-cycle timing exception that specifies two cycles for propagation of signal by the timing path. However, there is another timing exception that specifies the timing path as false path. In this situation, the false path timing exception is a dominant exception that overrides the multi-cycle path exception. Accordingly, the clock pair and exception analyzer 340 ignores the launch/capture clock pair based on the dominant timing exception.

The clock pair and exception analyzer 340 checks 460 if all timing nodes of the set of timing nodes have been processed. If there are additional timing nodes in the set remaining to be processed, the clock pair and exception analyzer 340 performs the steps 430, 440, 450, and 460 for each of these timing nodes. Accordingly, the clock pair and exception analyzer 340 marks a set of clock pairs as critical clock pairs and identifies corresponding timing exceptions.

After all the timing nodes of the set of timing nodes are processed to determine critical clock pairs and corresponding timing exceptions, the mode analyzer 330 modifies the mode of the circuit design by eliminating clocks that do not belong to any critical clock pairs and corresponding exceptions and timing constraints. The mode analyzer 330 may remove either a subset of clock pairs that are not marked as critical or the mode analyzer 330 may remove all clock pairs that are not marked as critical.

In some embodiments, the mode analyzer 330 identifies multiple sets of timing nodes and performs the steps 420, 430, 440, 450, and 460 for each of the sets of timing nodes. For example, a first set of timing nodes includes all end points of the circuit and a second set of timing nodes includes all start points. A third set of timing nodes may be analyzed that includes reconvergent nodes, i.e., nodes where two or more timing paths meet. The steps 420, 430, 440, 450, and 460 are performed for each of these sets of timing nodes.

Generating Simplified Merged Modes

Figure 5:
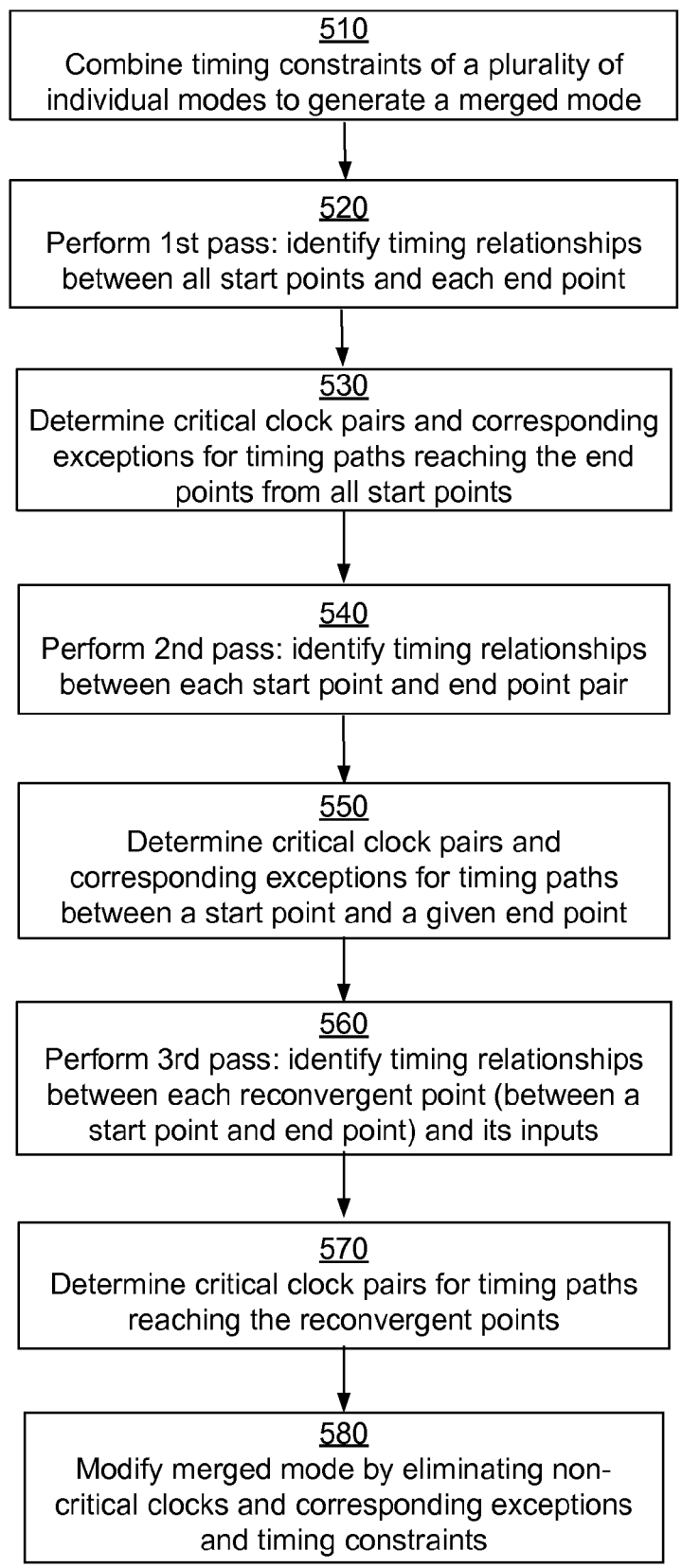
FIG. 5 shows a process for generating a simplified merged mode by merging a plurality of individual modes and simplifying the merged mode during the merge process, in accordance with an embodiment.

FIG. 5 shows a process for generating a simplified merged mode by merging a plurality of individual modes and simplifying the merged mode during the merge process, in accordance with an embodiment. The merged mode generator 350 generates merged mode from a plurality of individual modes provided as input. The merged mode generator 350 combines timing constraints from the individual modes. The merged mode generator 350 generates constraints for the merged mode by combining timing constraints from individual modes.

The merged mode generator 350 further determines a set of timing relationships for the merged mode as well as for each individual mode. The timing relationship comprises timing information associated with a first timing node and a second timing node, for example, clock information, exception states etc. The merged mode generator 350 compares timing relationships of the merged mode with the timing relationships of the individual modes to identify extraneous timing relationships present in the merged mode. The merged mode generator 350 adds timing constraints to the merged mode to eliminate the extraneous timing relationships. Methods and systems for comparing timing constraints between two circuit configurations are disclosed in the U.S. application Ser. No. 12/759,625, filed Apr. 13, 2010 and issued as U.S. Pat. No. 8,261,221 on Sep. 4, 2012, which is incorporated by reference in its entirety.

As illustrated in FIG. 5, the merged mode generator 350 performs three passes for comparing timing relationships between the merged mode and the individual modes. In each pass, the merged mode generator 350 identifies a source set of timing nodes and a target set of timing nodes. The merged mode generator 350 identifies the timing relationships associated with timing paths between the timing nodes of the source set and the target set. The merged mode generator 350 determines a set of timing relationships (based on the source set and target set of timing nodes) for the merged mode and each individual mode. The merged mode generator 350 compares the set of timing relationships of the merged mode with the corresponding sets of timing relationships of the individual modes to identify any extraneous timing relationships that need to be removed.

The process of determining the timing relationships associated with the timing paths between the source set and target set of timing nodes for the merged mode also provides all clock pairs and corresponding exceptions associated with the timing paths. Accordingly, for each target set of timing nodes, the merged mode generator 350 identifies the set of clock pairs and corresponding exceptions associated with timing paths between the source set and target set of timing nodes. The merged mode generator 350 provides the set of clock pairs to the clock pair and exception analyzer 340. The clock pair and exception analyzer 340 identifies certain clock pairs of set of clock pairs as critical. A clock pair from a set of clock pairs is identified as critical if it has the smallest timing interval between an edge of a launch clock and the matching edge of the capture clock compared to the remaining clock pairs of the set. The clock pair and exception analyzer 340 also identifies exceptions and timing constraints corresponding to clocks of the critical clock pairs.

For example, the clock pair and exception analyzer 340 marks a clock pair as critical for each timing node in the target set of timing nodes. At the end of the three passes (or fewer passes, if the merged mode generator 350 stops the process of merging with fewer passes), the merged mode generator 350 simplifies the merged mode by eliminating from the merged mode, clocks and corresponding exceptions and timing constraints for clocks that were not identified as critical during the above process (since they were not included in any critical clock pair). The merged mode generator 350 also eliminates timing exceptions and timing constraints associated with clocks that are eliminated. For example, if a multi-cycle path timing exception is associated with a timing path associated with a clock that is eliminated, the merged mode generator 350 eliminates the multi-cycle path timing exception.

The details of the three passes of the mode merging process are illustrated in FIG. 5. The merged mode generator 350 combines 510 the timing constraints of a plurality of individual modes to determine timing constraints of a merged mode. In an embodiment, the merged mode generator 350 determines a union of the timing constraints of all individual modes to determine the timing constraints of the merged mode.

The merged mode generator 350 performs 520 the first pass in which the merged mode generator 350 compares the merged mode with the individual modes with respect to timing relationships between all start points and a particular end point. The merged mode generator 350 repeats this process for each end point. If the comparison process determines a mismatch, the merged mode generator 350 flags the mismatch. The mismatch may be processed manually by a system administrator or by an automatic process which may include adding a timing exception to handle the mismatch. The merged mode generator 350 invokes the clock pair and exception analyzer 340 to determine 530 critical clock pairs for timing paths reaching the end points and corresponding timing exceptions. The clock pair and exception analyzer 340 determines 530 critical clock pairs and corresponding exceptions for timing paths reaching the end points If the merged mode generator 350 determines that there is no mismatch found for an end point in the first pass and a match cannot be determined decisively due to ambiguities after the first pass, the merged mode generator 350 performs 540 the second pass with respect to the selected end point. In the second pass, the merged mode generator 350 compares the merged mode with the individual modes with respect to timing relationships between a particular start point and a particular end point. The merged mode generator 350 repeats this process for each pair of a start point and an end point. The merged mode generator 350 identifies the set of clock pairs associated with each timing path associated with a start point and an end point. The merged mode generator 350 invokes the clock pair and exception analyzer 340 by providing the set of clock pairs associated with the start point and end point for determining 550 critical clock pairs associated with the start point and end point. The clock pair and exception analyzer 340 determines 550 critical clock pairs and corresponding exceptions associated with the start point and end point pair.

If a mismatch is found, the merged mode generator 350 flags the mismatch for the pair of start point and end point. If no mismatch is found for a start point and end point pair and a match cannot be determined decisively due to ambiguities after the second pass, the merged mode generator 350 performs 560 the third pass with respect to the selected start point and end point pair.

In the third pass, the merged mode generator 350 compares the merged mode and the individual modes with respect to timing relationships associated with a reconvergent point between the selected start point and end point pair. The merged mode generator 350 compares timing relationships associated with a timing node with an edge into the reconvergent point and the reconvergent point. If a mismatch is found, the merged mode generator 350 flags the mismatch for the timing relationship associated with timing node feeding into the reconvergent point and the reconvergent point. The merged mode generator 350 may remove the timing relationship causing the mismatch by adding a timing exception. If no mismatch is found for timing nodes feeding into this reconvergent point, the process is repeated for other reconvergent points between the selected start point and end point pair.

For each reconvergent point, the merged mode generator 350 also identifies all clock pairs and corresponding exceptions associated with timing paths reaching the reconvergent points. The merged mode generator 350 invokes the clock pair and exception analyzer 340 by providing the set of clock pairs and corresponding exceptions associated with the reconvergent point for determining 570 critical clock pairs associated with the reconvergent point. The clock pair and exception analyzer 340 determines 570 critical clock pairs and corresponding exceptions associated with the reconvergent points.

After completing the third pass, the merged mode generator 350 modifies 580 the merged mode generated by eliminating the clocks and corresponding exceptions that are not marked as critical in any of the passes described above. The merged mode generator 350 also eliminates certain exceptions and timing constraints associated with the clocks being eliminated. The modified merged mode provides the simplified version of the merged mode that can be used for performing timing analysis.

Embodiments can perform a subset of the steps shown in FIG. 4. For example, an embodiment can perform the first pass without performing the second pass and the third pass, if there is no ambiguity found by the first pass (in case of matches as well as mismatches determined by the first pass.) Similarly, an embodiment can perform the first pass and the second pass, without performing the third pass. The merged mode generator 350 determines the critical clock pairs and corresponding exceptions for all the passes that are executed by the merged mode generator 350.

Each pass can be described as determining timing relationships associated with a source set of timing nodes and a target set of timing nodes. For example, the first pass can be described as determining timing relationships associated with the source set comprising all the start points and the target set comprising a particular end point. Similarly, the second pass can be described as determining timing relationships associated with the source set comprising a particular end point and the target set comprising a particular start point. Finally the third pass can be described as determining timing relationships associated with a target set comprising a reconvergent point and the source set comprising two or more timing nodes that reach the reconvergent point via timing paths. The clock pair and exception analyzer 340 determines sets of critical clock pairs and corresponding exceptions for each of these combinations of source set and target set of timing nodes.

Computer Architecture

FIG. 6 is a high-level block diagram illustrating an example computer 600 that can be used for processing the steps of the processes described herein. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602. The types of computers 600 used can vary depending upon the embodiment and requirements. For example, a computer may lack displays, keyboards, and/or other devices shown in FIG. 6.

Alternative Embodiments

Although the process of generating simplified modes is described herein with respect to merged modes, the techniques described herein can be used to simplify any mode. Typically individual modes generated by designers are less likely to include clocks that are not critical. However, if a mode is generated by any tool or manually, that mode is expected to include clocks that are not critical. Such modes can be simplified by using the techniques described herein.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise. Upon reading this disclosure, those of skill in the art will appreciate still additional alternative structural and functional designs for a system and a process for simplifying modes of a circuit by eliminating timing constraints of the mode. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for simplifying modes of a circuit design, the method using a computer processor to execute steps including:
   receiving, by the computer processor, a description of a mode of a circuit, the description comprising a netlist and timing constraints associated with the netlist, the netlist comprising timing nodes connected by timing paths, and the timing constraints comprising one or more clocks and corresponding timing exceptions associated with one or more timing paths;
   identifying, by the computer processor, a set of timing nodes of the circuit, each timing node in the identified set of timing nodes associated with timing paths reaching the timing node;
   selecting, by the computer processor, critical clock pairs, the selecting comprising, for each timing node in the identified set of timing nodes:
      determining a set of clock pairs, each clock pair from the determined set of clock pairs associated with a particular timing path reaching the timing node, each clock pair including a launch clock and a capture clock associated with the particular timing path;
      for each clock pair from the determined set of clock pairs, determining a time interval between an edge of the launch clock and an edge of the capture clock;
      identifying a clock pair with a smallest time interval in the determined set of clock pairs; and
      marking the identified clock pair as a selected critical clock pair;
   modifying, by the computer processor, the description of the mode by eliminating one or more clocks that do not occur in the selected critical clock pairs; and
   performing a timing analysis of the circuit using the modified description of the mode.

2. The computer-implemented method of claim 1, wherein the determining a time interval between an edge of the launch clock and an edge of the capture clock is based on timing waveforms for a clock pair and considers a timing exception associated with the timing path of the clock pair.

3. The computer-implemented method of claim 2, wherein the timing constraints associated with the timing path of the clock pair are not overridden by other timing constraints specified in the description of the mode of the circuit.

4. The computer-implemented method of claim 2, wherein the determining a time interval for a clock pair comprises:
   determining that the timing path of a clock pair has multi-cycle path timing exceptions; and
   responsive to the determining that the timing path of the clock pair has multi-cycle path timing exceptions, using a time interval including a number of cycles specified by the multi-cycle path timing exceptions.

5. The computer-implemented method of claim 2, wherein the determining a time interval for a clock pair comprises:
   determining that the timing path of the clock pair has false path timing exceptions; and responsive to the determining that the timing path of clock pair has false path timing exceptions, ignoring the clock pair.

6. The computer-implemented method of claim 1, wherein the modifying the description of the mode comprises eliminating all clocks and corresponding timing exceptions that do not occur in any critical pair.

7. The computer-implemented method of claim 1, wherein the identified set of timing nodes includes one or more end points of the circuit and the timing paths associated with an end point include the timing paths from start points of the circuit to the end point.

8. The computer-implemented method of claim 1, wherein the identified set of timing nodes includes one or more start points of the circuit and the timing paths associated with a start point include the timing paths from the start point to each end point of the circuit.

9. The computer-implemented method of claim 1, wherein the identified set of timing nodes includes one or more reconvergent timing nodes of the circuit and the timing paths associated with a reconvergent timing node include a plurality of timing paths that reach the reconvergent timing node.

10. The computer-implemented method of claim 1, wherein the mode is a merged mode, the method further comprising:
receiving a description of a plurality of individual modes; and
merging individual modes from the plurality of individual modes to obtain the merged mode.

11. The computer-implemented method of claim 10, the method further comprising:
performing a traversal from a source set of timing nodes of the circuit to a target timing node of the circuit design;
identifying a set of timing paths connecting the source set of timing nodes with the target timing node based on the traversal; and
wherein the identified set of timing nodes includes the target timing node and the set of clock pairs and corresponding timing exceptions associated with the target timing node includes the clock pairs and corresponding timing exceptions associated with the identified set of timing paths.

12. The computer-implemented method of claim 11, wherein the target timing node is an end point of the circuit and the source set of timing nodes includes start points of the circuit.

13. The computer-implemented method of claim 11, wherein the target timing node is a start point of the circuit and the source set of timing nodes includes an end point of the circuit.

14. The computer-implemented method of claim 11, wherein the target timing node is a reconvergent timing node of the circuit and the source set of timing nodes includes a plurality of timing nodes that reach the reconvergent timing node between a given start point and a given end point.

15. The computer-implemented method of claim 1, wherein the identified set of timing nodes of the circuit is a first set of timing nodes including end points of the circuit, wherein the selecting critical pairs of launch clocks and capture clocks identifies a first set of critical clock pairs, the method further comprising:
identifying a second set of timing nodes of the circuit including start points of the circuit;
identifying a second set of critical clock pairs based on the second set of timing nodes;
identifying a third set of timing nodes of the circuit including reconvergent timing nodes of the circuit;
identifying a third set of critical clock pairs based on the third set of timing nodes; and
wherein the modifying the description of the mode comprises eliminating clocks that do not occur in any of the first set of critical clock pairs, the second set of critical clock pairs, and the third set of critical clock pairs.

16. A non-transitory computer-readable storage medium comprising stored instructions to modify a mode of a circuit design, the stored instructions, when executed by a computer processor, cause the computer processor to:
receive a description of a mode of a circuit, the description comprising a netlist and timing constraints associated with the netlist, the netlist comprising timing nodes connected by timing paths, and the timing constraints comprising one or more clocks and corresponding timing exceptions associated with one or more timing paths;
identify a set of timing nodes of the circuit, each timing node in the identified set of timing nodes associated with timing paths reaching the timing node;
select critical clock pairs, the selecting comprising, for each timing node in the identified set of timing nodes:
determine a set of clock pairs, each clock pair from the determined set of clock pairs associated with a particular timing path reaching the timing node, each clock pair including a launch clock and a capture clock associated with the particular timing path;
for each clock pair from the determined set of clock pairs, determine a time interval between an edge of the launch clock and an edge of the capture clock;
identify a clock pair with a smallest time interval in the determined set of clock pairs; and
mark the identified clock pair as a selected critical clock pair;
modify the description of the mode by eliminating one or more clocks that do not occur in the selected critical clock pairs; and
perform a timing analysis of the circuit using the modified description of the mode.

17. The non-transitory computer-readable storage medium of claim 16, wherein the mode comprises a merged mode, the stored instructions further comprising instructions that when executed by the computer processor, cause the computer processor to:
receive a description of a plurality of individual modes; and
merge individual modes from the plurality of individual modes to obtain the merged mode.

18. The non-transitory computer-readable storage medium of claim 17, the stored instructions further comprising instructions that when executed by the computer processor, cause the computer processor to:
perform a traversal from a source set of timing nodes of the circuit to a target timing node of the circuit design;
identify a set of timing paths connecting the source set of timing nodes with the target timing node based on the traversal; and
wherein the identified set of timing nodes includes the target timing node and the set of clock pairs and corresponding timing exceptions associated with the target timing node includes the clock pairs and corresponding timing exceptions associated with the identified set of timing paths.

19. The non-transitory computer-readable storage medium of claim 16, wherein the set of timing nodes of the circuit is a first set of timing nodes including end points of the circuit, wherein selecting critical pairs of launch clocks and capture clocks and corresponding exceptions identifies a first set of critical clock pairs and corresponding exceptions associated with the end points as critical, the stored instructions further comprising instructions that when executed by the computer processor, cause the computer processor to:
  identify a second set of timing nodes of the circuit including start points of the circuit;
  identify a second set of critical clock pairs based on the second set of timing nodes;
  identify a third set of timing nodes of the circuit including reconvergent timing nodes of the circuit;
  identify a third set of critical clock pairs based on the third set of timing nodes; and
  wherein instructions to modify the description of the mode further comprise instructions that cause the processor to eliminate clocks that do not occur in any of the first set of critical clock pairs, the second set of critical clock pairs, and the third set of critical clock pairs.

20. A computer-implemented system for simplifying a mode of a circuit design, the system comprising:
  a computer processor; and
  a non-transitory computer-readable storage medium comprising stored instruction, the stored instructions, when executed by the computer processor, cause the computer processor to:
    receive a description of a mode of a circuit, the description comprising a netlist and timing constraints associated with the netlist, the netlist comprising timing nodes connected by timing paths and the timing constraints comprising one or more clocks and corresponding timing exceptions associated with one or more timing paths;
    identify a set of timing nodes of the circuit, each timing node in the identified set of timing nodes associated with timing paths reaching the timing node;
    select critical clock pairs, the selecting comprising, for each timing node in the identified set of timing nodes:
      determine a set of clock pairs, each clock pair from the determined set of clock pairs associated with a particular timing path reaching the timing node, each clock pair including a launch clock and a capture clock associated with the particular timing path;
      for each clock pair from the determined set of clock pairs determine a time interval between an edge of the launch clock and an edge of the capture clock;
      identify a clock pair with a smallest time interval in the determined set of clock pairs; and
      mark the identified clock pair as a selected critical clock pair;
    modify the description of the mode by eliminating one or more clocks that do not occur in the selected critical clock pairs; and
    perform a timing analysis of the circuit using the modified description of the mode.

* * * * *